INVENTOR.
YOSHIO TAKAHASHI
BY
ATTORNEY

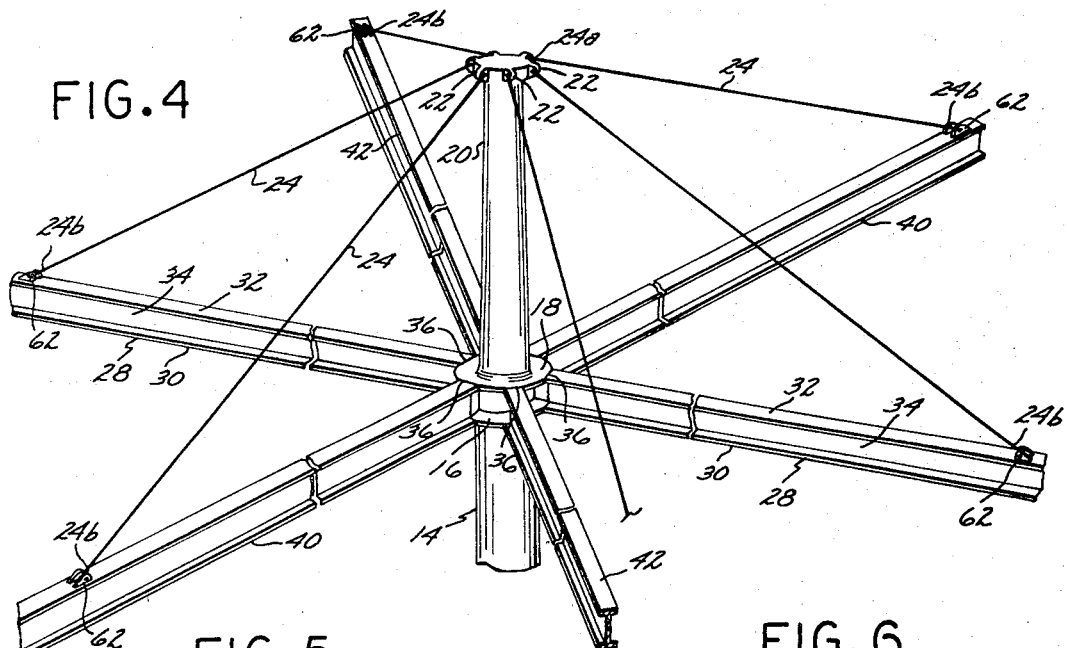
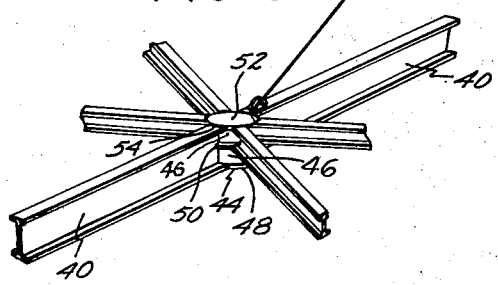
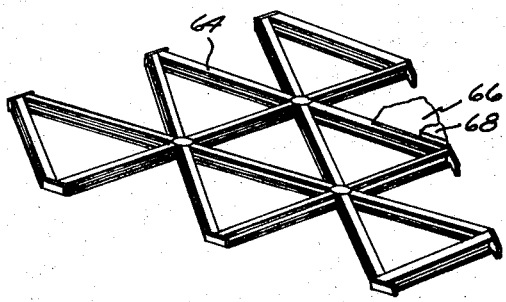
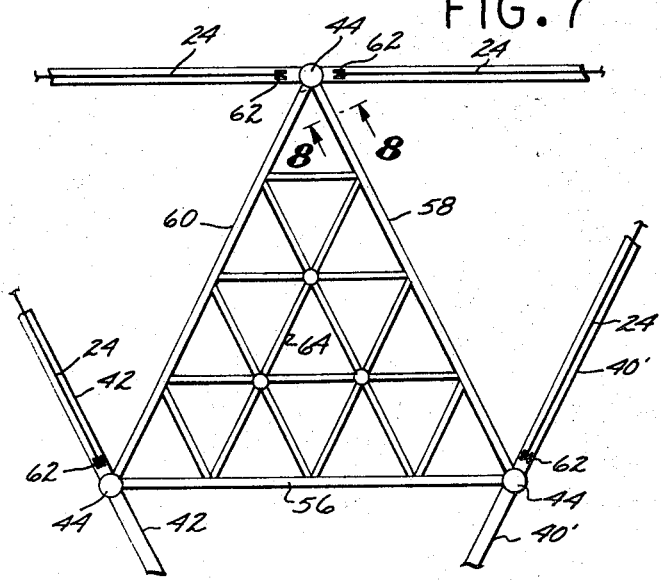
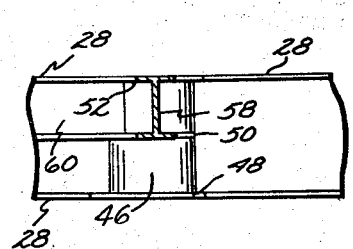

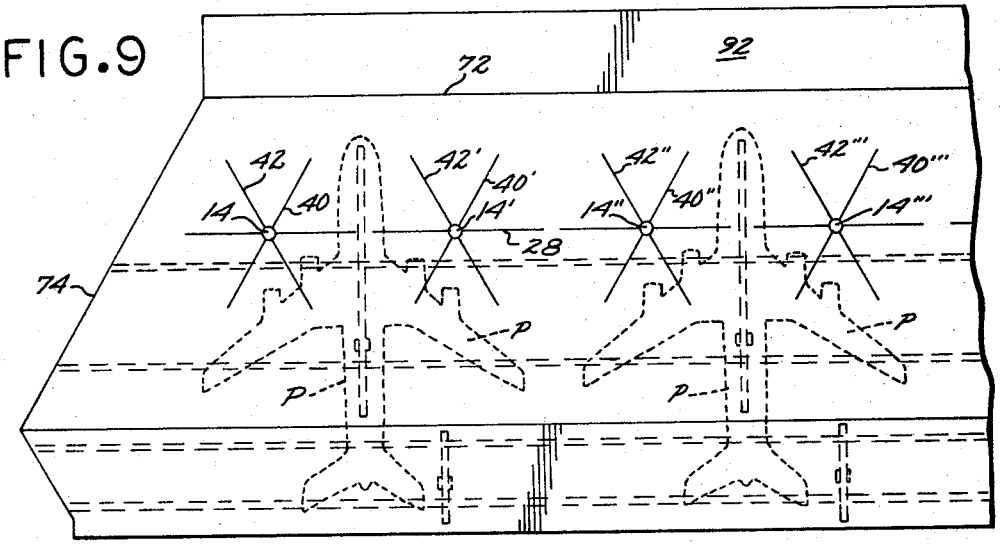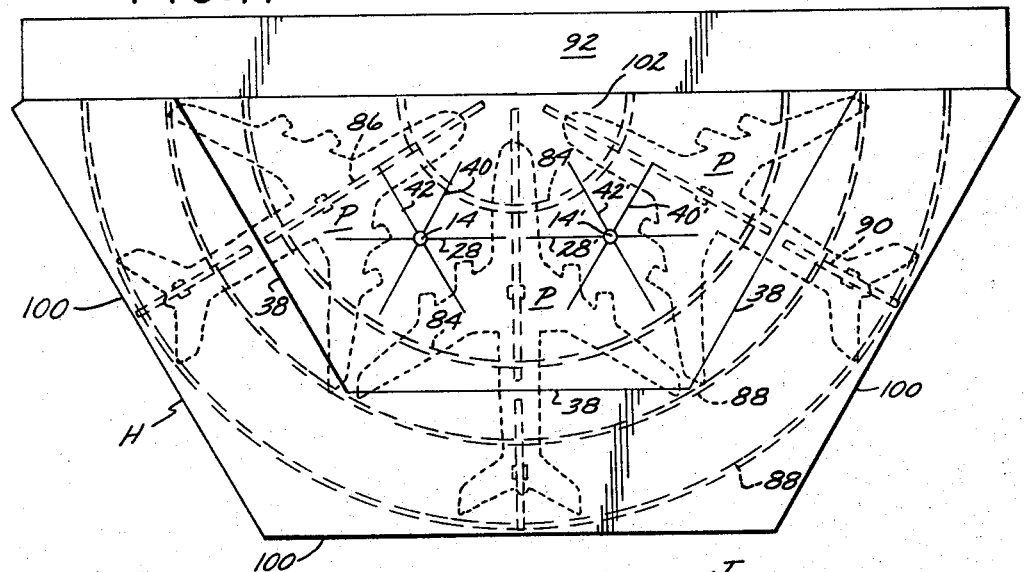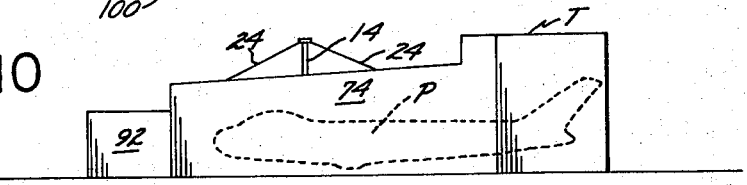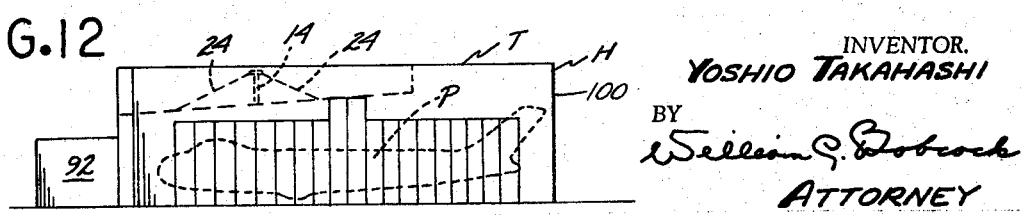

United States Patent Office 3,420,011
Patented Jan. 7, 1969

3,420,011
SUSPENDED TRIANGULAR GRID ROOF STRUCTURE
Yoshio Takahashi, 2-chome, Aikawa Nakadori,
Higashiyodogawa-ku, Osaka, Japan
Filed June 13, 1967, Ser. No. 645,793
U.S. Cl. 52—83
Int. Cl. E04b 7/14; E04b 1/342
8 Claims

ABSTRACT OF THE DISCLOSURE

A suspended triangular grid roof structure of high horizontal rigidity particularly adapted for use in forming a part of a building of extensive floor area, such as an aircraft maintenance hangar for larger planes currently coming into commercial use, of the Boeing 747 type and the like. The roof structure of the present invention permits drastic reduction in the volume of the building of which it forms a part relative to that of a building of comparable floor area of conventional design, with this reduction in volume being effected without in any way detracting from the utility of the building in efficiently carrying out aircraft maintenance work therein.

BACKGROUND OF THE INVENTION

*Field of the invention.*—The present invention relates generally to the field of building construction, and more particularly to a suspended triangular grid roof structure of high horizontal rigidity for use on buildings of extensive floor area to minimize waste space in said building, as well as the steel tonnage required in the fabrication thereof.

*Description of the prior art.*—As the use of aircraft has increased as a major mode of transportation, so has the size thereof, which poses a serious problem in the construction of hangars for the maintenance thereof. Each increase in size of an aircraft, both longitudinally and transversely, has required floor area in which to service a large plane. This increased floor area, of course, requires a roof of greater area which must extend thereover, and as the size of the roof increases, the span of the supporting girders becomes much greater, together with the need for extensive cross-bracing between the girders to provide suitable horizontal stiffness. The means to support such a roof above a large entrance into a building of the type described becomes a serious problem that, in the past, has been solved by the use of bulky overhead framing that is not only expensive in that it uses a high tonnage of steel, but drastically increases the interior volume of the building over that actually required to house aircraft of larger size. Such an increase in volume of the building is detrimental where it arises due chiefly to an increase in waste space for the difficulties of heating and cooling the interior increases with the size thereof. A further reason for minimizing the interior volume of a hangar is that the initial cost thereof is directly related to the interior volume thereof.

The present triangular grid roof structure has been evolved to eliminate or minimize certain operational disadvantages associated with aircraft hangars of the conventional or orthodox truss girder construction, by providing a building in which the interior volume thereof is minimized, the steel tonnage required in the fabrication thereof is drastically reduced, waste space minimized, and the initial cost of the hangar is substantially less than that of a building of comparable roofed floor area in accordance with hangar designs available heretofore.

SUMMARY OF THE INVENTION

An improved roof structure that includes the use of one or more suspension posts provided with circumferentially extending, longitudinally spaced, stiffeners on the upper portions thereof to which the ends of a number of main, horizontally disposed beams are secured by welding, or the like, with the outer ends of the main beams radiating from each suspension post being secured to connectors, at least a portion of which are affixed to second main beams, to define a sequence of triangular roof units which are further divided into triangular roof sections by a number of sub-beams. Each roof section in the structure of the present invention supports a lattice of triangular members to which roof plates are secured that are covered with a layer of waterproof material.

The main beams radiating from the suspension posts are at least partially supported by tensioned cables which extend downwardly and outwardly from the upper portions of the posts. The present roof structure provides a roof of high horizontal rigidity in which relatively lightweight beams may be utilized at a substantial reduction in cost over truss girders or the heavy beam structures previously employed in buildings of extensive floor area, with the main beams and sub-beams, while serving the function of defining a roof, also serve as supports for rails on which overhead cranes may travel.

A major object of the present invention is to provide an improved triangular grid roof structure of high horizontal rigidity, at lower initial cost than that of previously available roof structures, and one that is most versatile as to the shape and configuration of the building of which it forms a part.

Another object of the invention is to furnish a roof structure in which main beams and sub-beams are utilized, which to a large extent are supported by tension cables, with the smaller associated portions of roof structure being adapted to be prefabricated prior to delivery.

Another object of the invention is to provide a roof structure for a building of extensive floor area that permits work areas therein to be centralized, resulting in increased maintenance efficiency.

BRIEF DESCRIPTION OF THE DRAWINGS

FIGURE 4 is a perspective view of one of the suspension posts illustrating a number of downwardly and outwardly tensioned cables secured to main beams radiating from circumferentially extending, longitudinally spaced stiffeners in the form of flanges that form a part of the post;

FIGURE 5 is a perspective view of a connector forming a part of one of the main beams, to which connector, radially extending sub-beams are welded or otherwise secured thereto;

FIGURE 6 is a triangular lattice that fits within one of the triangular roof sections defined by a number of main beams or sub-beams that support roof plates over which a layer of waterproof material is applied;

FIGURE 7 is a fragmentary top plan view of a portion of the roof structure;

FIGURE 8 is a fragmentary transverse cross-sectional view of the srtucture shown in FIGURE 7, taken on the line 8—8 thereof;

FIGURE 9 is a top plan view of the hangar of which the roof structure shown in FIGURE 1 forms a part;

FIGURE 10 is an end elevational view of the hangar shown in FIGURE 9;

FIGURE 11 is a top plan view of another form of hangar embodying a suspended triangular grid roof structure in which the housed aircraft, shown in phantom line, are in radially disposed relationship; and FIGURE 12 is an end elevational view of the hangar shown in FIGURE 11.

DESCRIPTION OF THE PREFERRED EMBODIMENTS

Figure 1:
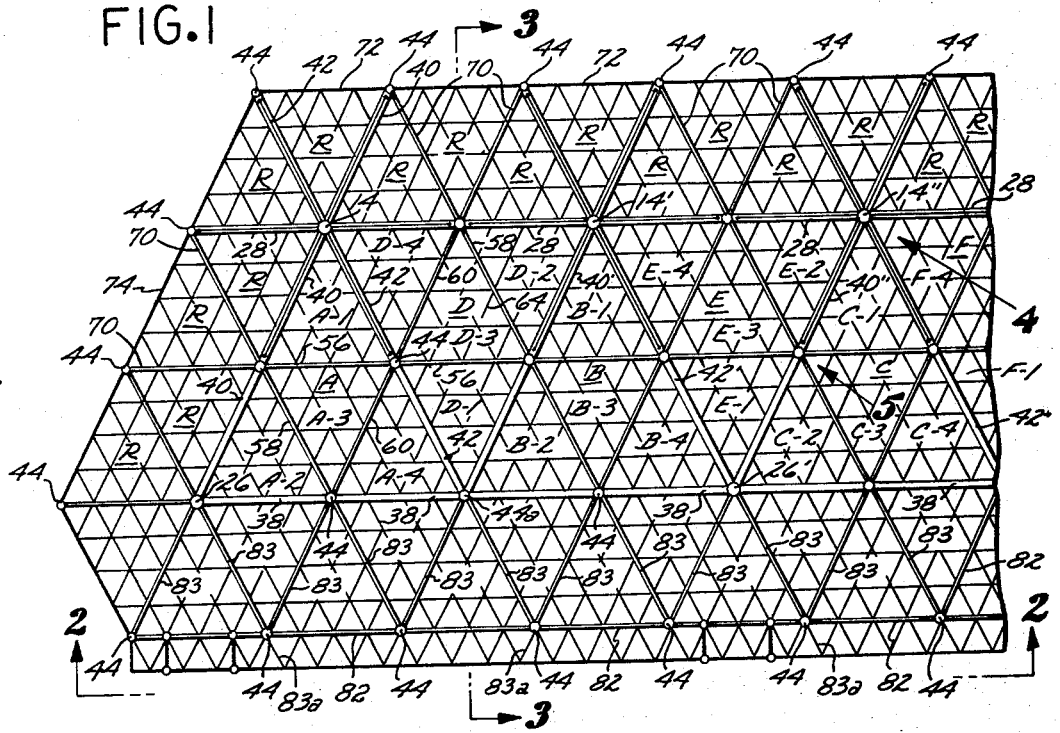
FIGURE 1 is a partial top plan view of the suspended triangular grid roof structure for an elongate hangar provided with entrance ways of sufficient width to permit aircraft up to a desired size to move therethrough.

The suspended triangular grid roof structure, as shown in connection with the hangars illustrated in both FIGURES 9 and 11, embodies the use of a number of suspension posts 14, one of which is illustrated in FIGURE 4. Suspension post 14 is preferably formed from centrifugally cast steel, from which two longitudinally spaced ring stiffeners 16 and 18 in the form of flanges extend circumferentially in elevated positions thereon. A portion 20 of the post 14 extends upwardly above the stiffeners 16 and 18. A number of circumferentially spaced eyes 22 project outwardly from the upper portion 20 of post 14. Normally, six eyes 22 extend outwardly from each post 14. Each eye 22 is engaged by a first end 24a of a tensioned cable 24 that extends downwardly and outwardly therefrom for reasons to be explained later herein.

Positioning of the suspension posts 14 in that form of the hangar shown in FIGURE 9 is illustrated in FIGURE 1. For clarity of reference herein, the suspension posts 14 are further identified on the drawings by primes to assist in locating a particular one thereof. The suspension posts 14, 14′ and 14″ are longitudinally aligned in a first row, as may be seen in FIGURE 1.

A number of second posts 26 are provided, as also shown in FIGURE 1, that are arranged in a longitudinally extending row forward of the row of suspension posts 14, 14′ and 14″. Each post 26 is of the same general structure as the suspension post 14, other than that the second post 26 does not include an upper portion 20 from which eyes 22 extend. In FIGURE 1, it will be seen that the second posts 26 are longitudinally spaced from one another a distance twice that of the distance between the suspension posts 14, 14′.

The suspension posts 14, 14′, and 14″ are connected by a longitudinally extending first main beam 28 provided with two flanges 30 and 32 that are connected by a vertically extending web 34, as best seen in FIGURE 4. The transverse cross section of beam 28 is of such size that the ends of flanges 30 and 32 abut against sections of the stiffeners 16 and 18 to which they are secured by a welding bead 36, or other suitable fastening means.

A second main beam 38 is provided, as shown in FIGURE 1, that extends longitudinally between the second posts 26, and the second main beam 38 is connected to these posts in the same manner beam 28 is connected to the stiffeners 16 and 18 above described. A part of the second main beam 38 cooperates with two angularly disposed, transversely extending additional first main beams 40 and 42 to define a triangular roof unit A, also shown in FIGURE 1. End portions of sections of the first main beam 40, and similar end sections of the main beam 42 are connected to the stiffeners 16 and 18, as may best be seen in FIGURE 4, by welding beads 36, or similar fastening means. An end of first beam 40 is connected to the stiffeners (not shown) on the second post 26.

A number of connectors 44 are provided, one of which is shown in detail in FIGURE 5. Each connector 44 includes a cylindrical shell or body 46 from which three longitudinally spaced rings 48, 50 and 52 project outwardly. The rings 48 and 52 are so spaced that the flanges on the first main beam 40 abut thereagainst and are rigidly secured thereto by a welding bead 54, or other suitable fastening means. Also the rings 50 and 52 are so longitudinally spaced that the ends of flanges on sub-beams of lighter weight to be described hereinafter, will abut thereagainst, and be secured to the stiffeners 50 and 52 by welding beads (FIGURE 5).

The second main beam 38 between the posts 26 and 26′ is divided into four sections of equal length by connectors 44, as shown in FIGURE 1. At the point where first main beam 42 intersects the second main beam 38 it is secured to the connector 44, as illustrated in FIGURE 1. The connector 44 located at the intersection of the second main beam 38 and first main beam 42 is further identified in the drawings by the suffix a. Those portions of the first main beams 40 and 42, second main beam 38 extending between the second post 26, suspension post 14 and connector 44a cooperatively define a triangular roof unit A (FIGURE 1). A connector 44 is interposed at the center of that section of first main beam 42 extending between the suspension post 14 and connector 44a, as also occurs with that portion of the second main beam 38 extending between the post 26 and connector 44a. Three sub-beams 56, 58 and 60 are disposed in triangular configuration inside the roof unit A, as shown in FIGURE 1, with these sub-beams being connected to the connectors 44, as shown.

Those sections of the beams 28, 40 and 42 adjacent the suspension posts 14 are in vertical alignment with the cables 24, as can be seen in FIGURES 1 and 4, from which beam sections lugs 62, or other fastening means, extend upwardly, and to which the lower ends 24b of the tensioned cables 24 are secured. The cables 24 support a substantial portion of the roof structure. The sub-beams 56, 58 and 60 cooperate with portions of the main beams 38, 40 and 42 to define the roof unit A and subdivide the same into sections A–1, A–2, A–3 and A–4 of lesser area. Additional first main beams 40′, 40″ are longitudinally spaced from the first main beam 40 but parallel thereto, and together with additional first main beams 42′ and 42″ (FIGURE 1) that are parallel to the main beam 42 cooperatively define roof units B, C, D, E, and F, in conjunction with the first main beam 28 and second main beam 38. The structure of roof units B, C, D, E, and F is identical to that of roof unit A and accordingly the detailed structure thereof need not be repeated.

By use of sub-beams 56, 58 and 60, the roof units are further subdivided into triangular roof sections. The roof sections comprising each of the roof units B, C, D, E and F is identified in the same manner as those roof sections comprising roof unit A.

A number of triangular lattices 64 are provided, one of which is shown in FIGURE 6, and are preferably prefabricated prior to delivery to the job site. The lattices 64 are raised one-by-one and welded into place within the confines of the roof sections, as for instance, the lattice in roof section D–3 shown in FIGURES 1 and 7. Triangular roof panels 66 (FIGURE 6) are supported by a lattice 64 and rigidly secured thereto by welding, or the like. When so supported, the panels 66 serve as a base on which a waterproof layer 68 of roofing material such as asphalt is applied, as also shown in FIGURE 6.

Portions of first main beams 42, 40; 42′, 40′, as well as 42″, 40″ radiate rearwardly from the suspension posts 14, 14′ and 14″, which beams in combination with sub-beams 70, radiate rearwardly from the connectors 44 in first main beam 28 to provide a longitudinal sequence of triangular roof sections R. The rear ends of the main beams and sub-beams of roof sections R described above are joined to connectors 44 incorporated as a part of the rear wall 72 of the building, as illustrated in FIGURE 1.

Those sub-beams 70 which radiate to the left (FIGURE 1) from connector 44 in first main beam 40 between suspension post 14 and second post 26, together with portions of first main beams 42 and 28 radiating to the rear and side of suspension post 14, cooperate to provide a continuous sequence of roof sections R which extend forwardly to second main beam 38. The main beams and sub-beams extending to the left as just described are joined to connectors 44 that are incorporated as part of an end wall 74 of the building.

Figure 3:
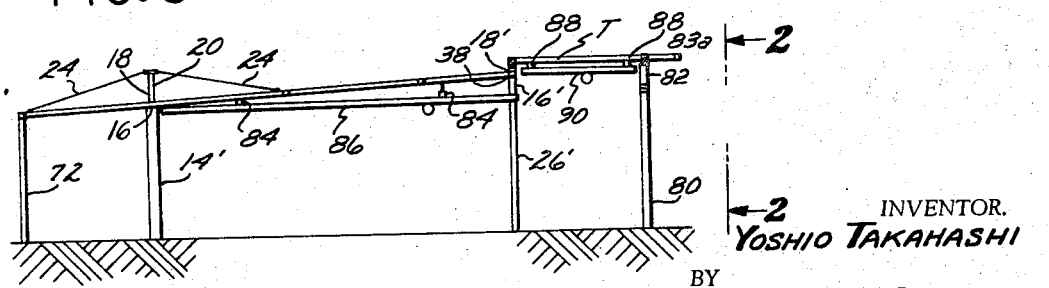
FIGURE 3 is a transverse vertical cross-sectional view of the hangar shown in FIGURE 1, taken on the line 3—3 thereof.

The stiffeners 16' and 18' in second posts 26 and 26' (FIGURE 3), as well as the second main beam 38 connected thereto, are at a substantially higher elevation than the stiffeners 16 and 18 on first posts 14, 14' and 14" and the main beam 28 connected thereto, whereby that portion of the roof rearwardly of the main beam 38 slopes downwardly and rearwardly.

Figure 2:
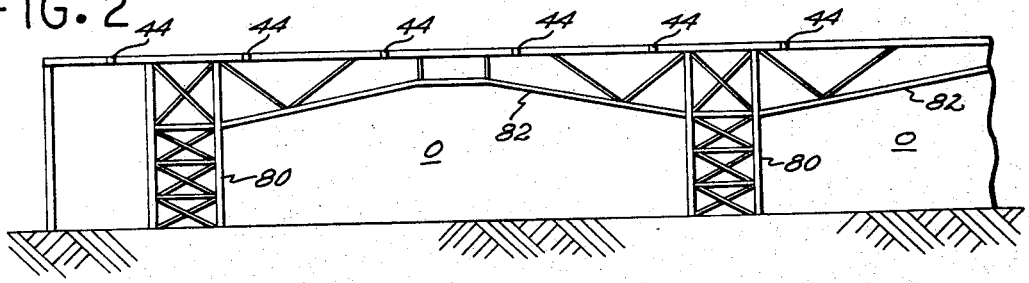
FIGURE 2 is a fragmentary front elevational view of the hangar shown in FIGURE 1, taken on the line 2—2 thereof.

Entryways O for aircraft P to be moved into or out of the hangar shown in FIGURES 1 and 9 are illustrated in FIGURE 2. Entryways O are defined between longitudinally spaced vertical supports 80 between which trusses 82 extend. The upper trusses 82 support connectors 44 from which sub-beams 83 extend rearwardly to be supported by suitable means above the second main beam 38. The sub-beams 83 and extensions 83a thereof cooperatively define the horizontal roof T shown in FIGURE 3. Entryways O may be closed when desired by suitable longitudinally movable doors (not shown).

The space occupied by the aircraft P while housed in the hangar building previously described is best shown in FIGURES 9 and 10. The first suspension posts 14, 14', 14" and 14''' (FIGURE 9) are so spaced as to provide ample space to accommodate the forward portion of the fuselage of one of the aircraft P therebetween.

The roof structure of the building rearwardly of the second main beam 38 is sufficiently high that transversely spaced, longitudinally extending rails 84 (FIGURE 3) can be suspended therefrom to movably support a crane 86 for maintenance work on an aircraft fuselage, engines, wings or landing gear housed in the building. Transversely spaced, longitudinally extending rails 88 are suspended from the roof structures T of the present invention, and these rails, as may be seen in FIGURES 3 and 9, movably support an overhead crane 90 for use in maintenance work on the tail sections of aircraft P while in the hangar building. When the building shown in FIGURES 1, 9 and 10 is used as a hangar, a second longitudinally extending building 92 substantially lower in height than the hangar is normally provided to the rear thereof, which second building is, in effect, an annex building containing various management offices, control departments, warehousing facilities, or the like.

The roof structure described herein is most versatile as to general utility, and can be equally well adapted to a building H such as shown in FIGURES 11 and 12 of partial polygon configuration, and when suitable entryways (not shown) are provided in the walls 100 thereof, the building can serve very well as a maintenance hangar for aircraft P. In a building H the roof structure is defined by the first main beams 28, 40, 42 and 40', 42' that are cable-supported from the first posts 14, 14'. A second main beam 38 is provided that includes angularly disposed sections, which beam is supported by second posts (not shown). In the building H the planes P are arranged in angular relationship, whereby a central work area 102 is defined wherein maintenance personnel may work on the forward fuselage portions of the planes in a highly efficient manner. The rails 84 and 88 employed in a building structure H are arcuate whereby the cranes 86 and 90 supported therefrom can be readily used in servicing each plane.

From the previous description of the roof structure, it will be seen that it is particularly adapted for embodiment in a building of large floor area that is intended for use as an aircraft maintenance hangar. However, the roof structure of the present invention is not limited to this use alone, but is equally adapted for incorporation in buildings of large floor area such as warehouses, or the like.

It will also be apparent that inasmuch as the first main beams 28, 40, 42; 40', 42' and 40", 42" are, to a large extent, supported by the cables 24, these beams can be of far lighter weight and depth than normally would be employed in buildings of a conventional design, with a consequent saving in cost. Furthermore, due to the positioning of the first and second main beams and associated sub-beams, a roof structure is provided of high horizontal rigidity whereby expensive, waste space created by cross-bracing can be eliminated, again at a substantial saving in construction costs.

I claim:

1. In combination with a plurality of walls defining a building, a roof structure of substantial horizontal rigidity and minimized thickness, comprising:
    (a) at least one first vertical suspension post disposed inside said walls, with a plurality of longitudinally spaced, outwardly extending stiffeners at an elevated position being provided on said post, which post further includes an upper portion above said stiffeners, and a plurality of circumferentially spaced eyes that extend outwardly from said upper portion;
    (b) a plurality of second vertical posts disposed inside said walls and spaced from said first post;
    (c) a purality of elevated, horizontal, first main beams disposed in angular relationship and radiating from said first post and secured to said stiffeners thereon;
    (d) an elevated, horizontal, second main beam extending between said second posts and rigidly secured thereto;
    (e) a plurality of elevated spaced connectors located in spaced positions along said first and second main beams, the upper portions of said walls, and between said first and second posts, with at least a portion of said first main beams being affixed to said connectors in said second main beam to define a plurality of triangular roof units;
    (f) a plurality of horizontal sub-beams that are angularly disposed relative to one another and secured at their ends to said connectors to provide a continuous sequence of triangular roof sections both interiorly and exteriorly of said roof units, with said roof units lying in a plane common to that of said first and second main beams;
    (g) a plurality of triangular rigid lattices disposed within said roof sections and rigidly secured thereto;
    (h) a plurality of roof plates that lie on said lattices and are secured thereto;
    (i) a plurality of tensioned cables extending downwardly and outwardly from said eyes to said first main beams to which they are rigidly secured to support a substantial portion of the weight of said roof structure; and
    (j) a layer of waterproof material overlying said roof plates.

2. A roof structure as defined in claim 1 wherein said main beams and sub-beams comprise I-beams, with said stiffeners being so vertically spaced that the ends of flanges of said first main beams abut thereagainst and are secured thereto by welding.

3. A roof structure as defined in claim 1 wherein each of said connectors includes:
    (k) a rigid cylindrical body; and
    (l) three longitudinally spaced, circumferentially extending rings that project outwardly from said body, to which rings the ends of said main beams and sub-beams are secured.

4. A roof structure as defined in claim 3 wherein said main beams and sub-beams comprise I-beams, and said main beams are of such size that the ends of the flanges thereof abut against the upper and lower rings on said bodies and are secured thereto by welding, with said sub-beams being of such size that the ends of the flanges thereof abut against two adjacently disposed rings on said bodies to which they are secured by welding.

5. A roof structure as defined in claim 1 wherein one wall of said building is defined by two longitudinally spaced, upwardly extending supports between which a truss extends and is support thereby to define a large opening through which an aircraft can move, which truss supports a plurality of said connectors in spaced relationship, with a plurality of sub-beams radiating rearwardly from said connectors towards said second main beam to define a roof structure forwardly therefrom that is at a higher elevation than that portion of said roof structure located rearwardly of said second main beam.

6. A roof structure as defined in claim 1 which includes a plurality of said first posts that are in longitudinal spaced relationship and connected by one of said first main beams that is substantially parallel to said second main beam.

7. A roof structure as defined in claim 1 wherein said first post is formed as an integral unit from centrifugally cast steel.

8. A roof structure as defined in claim 1 wherein the building of which it forms a part has a plurality of spaced entrance openings formed in at least one wall thereof through which aircraft can be moved and disposed side-by-side in said building, which building serves as an aircraft maintenance hangar.

References Cited

UNITED STATES PATENTS

| | | | |
|---|---|---|---|
| 1,566,521 | 12/1925 | Brinton | 52—83 |
| 1,885,781 | 11/1932 | St. John | 52—83 X |
| 2,247,186 | 6/1941 | Chelazzi | 52—83 |
| 2,282,756 | 5/1942 | Curran | 52—82 |
| 2,574,307 | 11/1951 | Whelan | 52—83 X |

FRANK L. ABBOTT, *Primary Examiner.*

PRICE C. FAW, JR., *Assistant Examiner.*

U.S. Cl. X.R.

52—648